(No Model.)

O. BARNARD.
CURD CUTTER.

No. 528,521. Patented Nov. 6, 1894.

Witnesses:
John Grist
C. H. Horsey.

Inventor:
Ormond Barnard
By Henry Grist
Attorney.

UNITED STATES PATENT OFFICE.

ORMOND BARNARD, OF OXFORD MILLS, CANADA.

CURD-CUTTER.

SPECIFICATION forming part of Letters Patent No. 528,521, dated November 6, 1894.

Application filed August 11, 1894. Serial No. 520,023. (No model.) Patented in Canada July 10, 1894, No. 46,542.

*To all whom it may concern:*

Be it known that I, ORMOND BARNARD, of Oxford Mills, in the Province of Ontario, in the Dominion of Canada, have invented certain new and useful Improvements in Curd-Cutters, (for which I have obtained a patent of the Dominion of Canada, numbered 46,542, and dated July 10, 1894;) and I do hereby declare that the following is a full, clear, and exact description of the same, reference being had to the accompanying drawings, in which—

Figure 1:
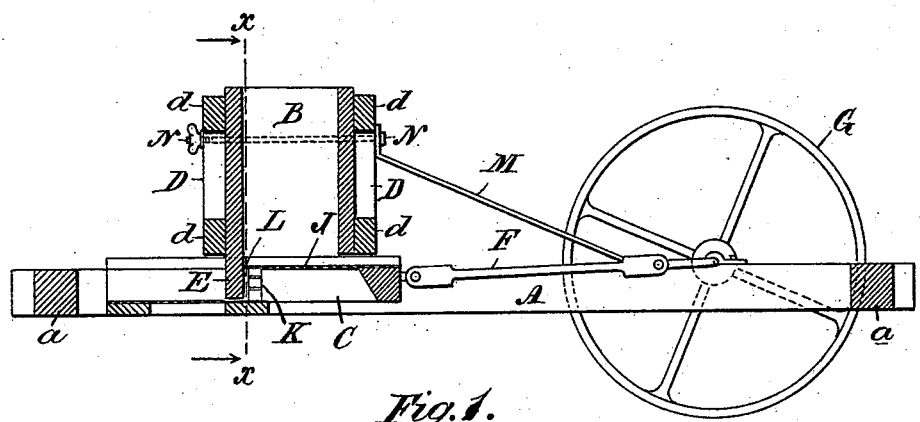
Figure 2:
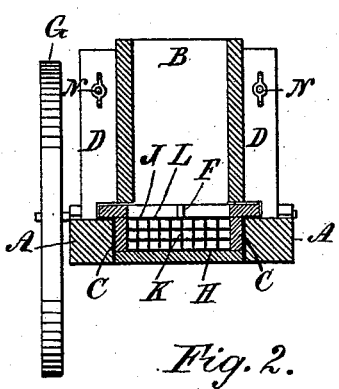
Figure 3:
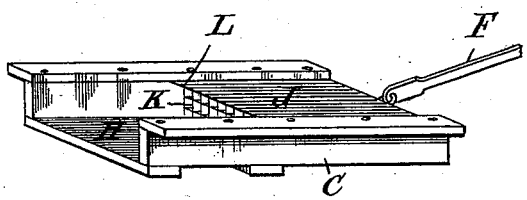

Figure 1, is a longitudinal vertical section of my improved curd-cutter. Fig. 2, is a section of the same on the line $x\ x$, and Fig. 3, is a perspective view of the cutter-head or knife section detached from the supporting frame.

My invention has for its object to facilitate separation of the curd from the whey, by cutting the curd, and my curd-cutter is designed to accomplish the same with great facility and effectiveness, whereby the curd is divided into lengths oblong or square at each return stroke of a reciprocating cutter having intersecting knives, said cutter or knife section closing the bottom of a hopper into which the curd is fed.

My invention consists of a curd-cutter having a bottomless hopper supported by a frame carrying a reciprocating cutter-head immediately under said hopper, said head having intersecting knives intervening an upper and a lower or subdividing floor, said sub-floors closing the bottom of said hopper alternately when the cutter-head is reciprocated, whereby the curd at the bottom of the hopper is separated from the curd above the cutter-head and the separated portion is cut or divided by the intersecting knives and forced through them by the knives closing against a stop board below the hopper.

A, A, are two parallel bars or ways connected by cross pieces $a, a$, and constitute the supporting frame carrying a hopper B, and a sliding cutter C, which closes the bottom of the hopper, and said hopper is held in place by corner posts D, footed into the bars A, A, which posts are connected by cross pieces $d$, $d$, halved thereto to prevent lateral movement of the hopper and to allow it to be removed vertically for convenience of cleansing.

In the path of the cutter C, the hopper is provided with a stop board E, extending downwardly to receive the thrust of the curd while being cut, and said cutter consists of a frame which slides on the bars or ways A, A, and is reciprocated by a pitman F, and driving wheel G, or in any other suitable manner, and said cutter or head has a lower floor H, from the forward end and extends toward the opposite end to about one half the length of the head, and an upper floor J, from said opposite end, and said floors are connected by intersecting knives K, at or about the middle of the cutter-head, and through said knives the curd escapes from the hopper after being cut by the knives moving toward the stop board E. The front edge of the upper floor projects forwardly of the intersecting knives and is sharpened to make a cutting edge L, to clean the cut curd from the uncut above the cutter.

The cutter floors close the bottomless hopper alternately when the cutter-head is reciprocated and retain the curd fed thereto until a certain portion escapes through the intersecting knives. After a cut has been effected the cutter-head on the return motion permits the curd in the hopper to drop onto or against the lower floor, so that when the cutter-head is again pushed forward, another cut is effected, the curd passing between the intersecting knives K, as before, by the knives approaching the stop board E, which receives the thrust of the curd while being cut.

M, are stay rods and N, bolts and nuts for bracing the hopper to the supporting bars A, A, of the main frame.

I claim as my invention—

1. The reciprocating curd-cutter head C, comprising a supporting frame having a lower sub-floor H, and an upper sub-floor J, extending toward one another from opposite ends of the frame, said floors connected at their inner ends by intersecting knives K, in combination with a hopper B, and a stop board E, against which said knives act as set forth, for the purpose described.

2. The cutter head C, having upper and lower half floors connected at their inner ends by intersecting knives K, in combination with a supporting frame having parallel ways or bars A, A, on which said cutter-head slides, and a bottomless hopper B, above said cutter-head, and a stop board E, in the path of said cutter head, said board resisting the thrust of the curd while being cut, and means for reciprocating said cutter head whereby the curd fed into the hopper is cut into square oblong lengths by said intersecting knives and forced therethrough by the reciprocation of the cutter-head horizontally, as set forth.

3. The combination of the supporting frame having parallel bars or ways A, A, the bottomless hopper B, on top of said ways, the stop board E below said hopper, the cutter-head C, having lower and upper sub-floors H, L, connected by intersecting knives K, said cutter-head sliding reciprocally upon said supporting frame and against said stop board and under said hopper, and a pitman, wheel or crank operating said cutter-head by suitable motive power, whereby the curd is cut into oblong lengths and discharged through the intersecting knives, as set forth.

ORMOND BARNARD.

Witnesses:
JOHN GRIST,
HENRY GRIST.